(12) United States Patent
Miyazoe et al.

(10) Patent No.: US 10,544,875 B2
(45) Date of Patent: Jan. 28, 2020

(54) SOLENOID VALVE AND MANIFOLD-TYPE SOLENOID VALVE ASSEMBLY

(71) Applicant: SMC CORPORATION, Chiyoda-ku (JP)

(72) Inventors: Shinji Miyazoe, Moriya (JP); Shinichi Yoshimura, Moriya (JP); Takashi Murakami, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/762,123

(22) PCT Filed: Oct. 4, 2016

(86) PCT No.: PCT/JP2016/079382
§ 371 (c)(1),
(2) Date: Mar. 22, 2018

(87) PCT Pub. No.: WO2017/061399
PCT Pub. Date: Apr. 13, 2017

(65) Prior Publication Data
US 2018/0283571 A1 Oct. 4, 2018

(30) Foreign Application Priority Data
Oct. 5, 2015 (JP) .................................. 2015-197930

(51) Int. Cl.
*F16K 31/06* (2006.01)
*F16K 27/04* (2006.01)

(52) U.S. Cl.
CPC ........ *F16K 31/0613* (2013.01); *F16K 27/041* (2013.01); *F16K 27/048* (2013.01); *Y10T 137/8671* (2015.04)

(58) Field of Classification Search
CPC .. F16K 31/0613; F16K 27/048; F16K 27/041; Y10T 137/8671
See application file for complete search history.

(56) References Cited

U.S. PATENT DOCUMENTS 5,664,604 A * 9/1997 Sato et al. .......... F15B 13/0817
137/596.16
5,664,789 A * 9/1997 Hayashi .............. F15B 13/0817
277/345

(Continued)

FOREIGN PATENT DOCUMENTS

JP 55-74876 U 5/1980
JP 3-59572 U 6/1991

(Continued)

OTHER PUBLICATIONS

Japanese Office Action issued in Japanese Patent Publication No. 2015-197930 dated Mar. 18, 2019.

(Continued)

*Primary Examiner* — Kevin L Lee
(74) *Attorney, Agent, or Firm* — Oblon, McClelland, Maier & Neustadt, L.L.P.

(57) ABSTRACT

First and second insertion holes and first and second recessed grooves are formed such that, on a plane that is perpendicular to a first side surface and a second side surface and that includes an axis of a spool-sliding hole, the shortest distance from the axis of the spool-sliding hole to a hole wall surface of the first insertion hole, the shortest distance from the axis of the spool-sliding hole to a hole wall surface of the second insertion hole, the distance from the axis of the spool-sliding hole to a bottom wall surface of the first recessed groove, and the distance from the axis of the spool-sliding hole to a bottom wall surface of the second recessed groove are equal to one another.

12 Claims, 6 Drawing Sheets (56) References Cited

U.S. PATENT DOCUMENTS 6,688,853 B1 * 2/2004 Burkett et al. ...... F04B 27/1804
251/61
6,748,897 B2 6/2004 Enzaki et al.

FOREIGN PATENT DOCUMENTS

| JP | 7-119851 A | 5/1995 |
| JP | 2003-184826 A | 7/2003 |
| JP | 2012-255508 A | 12/2012 |
| JP | 2013-083323 A | 5/2013 |

OTHER PUBLICATIONS

International Search Report dated Dec. 27, 2016 in PCT/JP2016/079382, filed on Oct. 4, 2016.

* cited by examiner

SOLENOID VALVE AND MANIFOLD-TYPE SOLENOID VALVE ASSEMBLY

TECHNICAL FIELD

The present invention relates to a solenoid valve that is to be mounted onto a mounting surface of a manifold base by using mounting screws in such a manner that a plurality of the solenoid valves are arranged in a row and a manifold-type solenoid valve assembly that is formed by mounting the plurality of solenoid valves onto the manifold base.

BACKGROUND ART

In the related art, as described in PTL 1, a switching valve is known that is to be mounted onto a mounting surface of a manifold base by using mounting screws in such a manner as that a plurality of the switching valves are arranged in a row. The switching valve has ridge portions and grooves, which are formed on and in side surfaces of a body having a sliding hole, and insertion holes that are formed along the ridge portions and through which the mounting screws are to be inserted.

The ridge portions and the grooves extend in a top-bottom direction with respect to the mounting surface of the manifold base and are each formed so as to have a semicircular cross section, the diameter of the cross section of each of the ridge portions and the diameter of the cross section of each of the grooves being approximately the same as each other. Accordingly, positioning of the switching valve can be performed by inserting the ridge portions of the switching valve into the grooves of one of the other switching valves that is adjacent to the switching valve. In addition, the plurality of switching valves can be efficiently mounted onto the manifold base by inserting screws or vises (hereinafter referred to as screws or the like) through the insertion holes so that the switching valves are screwed onto the manifold base.

However, in the switching valve described in PTL 1, the outer diameter of the sliding hole is determined in accordance with the distance from the axis of the sliding hole to the bottom of each of the grooves, and thus, it cannot be said that the thickness between a mounting hole and the sliding hole is efficiently utilized.

On the other hand, there is a need for this type of switching valve to be reduced in size and to have a large flow rate, and thus, it is desirable that the hole diameter of a sliding hole be efficiently increased with respect to the width of a body.

CITATION LIST

Patent Literature

PTL 1: Japanese Unexamined Utility Model Registration Application Publication No. 55-74876

SUMMARY OF INVENTION

Technical Problem

It is an object of the present invention to provide a solenoid valve and a manifold-type solenoid valve assembly each having a design structure in which the relationship between the hole diameter of a sliding hole and the width of a body is further rationalized.

Solution to Problem

To solve the above described problem, a solenoid valve according to an aspect of the present invention is a solenoid valve that is to be mounted onto a manifold base by using mounting screws in such a manner that a plurality of the solenoid valves are arranged in a row, the solenoid valve including a valve body that has a longitudinal direction, a transverse direction, and a height direction and in which a spool-sliding hole extending through the valve body in the longitudinal direction is formed and a spool that is slidably inserted in the spool-sliding hole. The valve body has a first side surface and a second side surface that extend in the longitudinal direction of the valve body and that are parallel to each other. A first ridge extending in the height direction of the valve body and a first recessed groove extending parallel to the first ridge are formed on and in the first side surface, and a second ridge and a second recessed groove are formed on and in the second side surface, the second ridge extending in the height direction of the valve body at a position corresponding to the first recessed groove, the second recessed groove extending parallel to the second ridge at a position corresponding to the first ridge. The first recessed groove is formed in such a manner as to be capable of accommodating the second ridge of another solenoid valve that is adjacent to the first side surface of the solenoid valve, and the second recessed groove is formed in such a manner as to be capable of accommodating the first ridge of another solenoid valve that is adjacent to the second side surface of the solenoid valve. The valve body has a first insertion hole that is formed along the first ridge and that allows one of the mounting screws to be inserted through the first insertion hole and a second insertion hole that is formed along the second ridge and that allows one of the mounting screws to be inserted through the second insertion hole. The first insertion hole and the second insertion hole are formed in the valve body in such a manner that a portion of the first insertion hole and a portion of the second insertion hole in a diametrical direction respectively extend through the inside of the first ridge and the inside of the second ridge. The first and second insertion holes and the first and second recessed grooves are formed in such a manner that, on a plane that is perpendicular to the first side surface and the second side surface and that includes an axis of the spool-sliding hole, the shortest distance from the axis of the spool-sliding hole to a hole wall surface of the first insertion hole, the shortest distance from the axis of the spool-sliding hole to a hole wall surface of the second insertion hole, the distance from the axis of the spool-sliding hole to a bottom wall surface of the first recessed groove, and the distance from the axis of the spool-sliding hole to a bottom wall surface of the second recessed groove are equal to one another.

In addition, the solenoid valve according to another aspect of the present invention is a solenoid valve that is to be mounted onto a manifold base by using mounting screws in such a manner that a plurality of the solenoid valves are arranged in a row, the solenoid valve including a valve body that has a longitudinal direction, a transverse direction, and a height direction and in which a spool-sliding hole extending through the valve body in the longitudinal direction is formed and a spool that is slidably inserted in the spool-sliding hole. The valve body has a first side surface and a second side surface that extend in the longitudinal direction of the valve body and that are parallel to each other. A first ridge extending in the height direction of the valve body and a first recessed groove extending parallel to the first ridge are formed on and in the first side surface, and a second ridge and a second recessed groove are formed on and in the second side surface, the second ridge extending in the height direction of the valve body at a position corresponding to the first recessed groove, the second recessed groove extending parallel to the second ridge at a position corresponding to the first ridge. The first recessed groove is formed in such a manner as to be capable of accommodating the second ridge of another solenoid valve that is adjacent to the first side surface of the solenoid valve, and the second recessed groove is formed in such a manner as to be capable of accommodating the first ridge of another solenoid valve that is adjacent to the second side surface of the solenoid valve. The valve body has a first insertion hole that is formed along the first ridge and that allows one of the mounting screws to be inserted through the first insertion hole and a second insertion hole that is formed along the second ridge and that allows one of the mounting screws to be inserted through the second insertion hole. The first insertion hole and the second insertion hole are formed in the valve body in such a manner that a portion of the first insertion hole and a portion of the second insertion hole in a diametrical direction respectively extend through the inside of the first ridge and the inside of the second ridge. When a height from the first side surface to a top surface of the first ridge and a height from the second side surface to a top surface of the second ridge are each denoted by $h1$, a depth from the first side surface to a bottom wall surface of the first recessed groove and a depth from the second side surface to a bottom wall surface of the second recessed groove are each denoted by $h2$, a minimum wall thickness between a hole wall surface of the first insertion hole and the top surface of the first ridge and a minimum wall thickness between a hole wall surface of the second insertion hole and the top surface of the second ridge are each denoted by $c$, and a diameter of the first insertion hole and a diameter of the second insertion hole are each denoted by $d$, a dimensional relationship between these values satisfies the following formulas:

$c+d-h1=h2$ and $h1>h2$.

A cross-sectional shape of the spool-sliding hole in a direction perpendicular to the axis of the spool-sliding hole may be a long hole shape having a long axis oriented in the height direction of the valve body and a short axis oriented in the transverse direction of the valve body.

As an example, the cross-sectional shape is a shape having left and right hole side walls, which extend linearly in a direction in which the long axis extends and which are parallel to each other, upper and lower hole end walls, the upper hole end wall connecting first ends of the left and right hole side walls to each other, the lower hole end wall connecting second ends of the left and right hole side walls to each other, or an elliptical shape.

A manifold-type solenoid valve assembly according to another aspect of the present invention is a manifold-type solenoid valve assembly including a solenoid valve including a valve body that has a longitudinal direction, a transverse direction, and a height direction and in which a spool-sliding hole extending through the valve body in the longitudinal direction is formed and a spool that is slidably inserted in the spool-sliding hole and a manifold base having a plurality of valve-mounting surfaces onto which a plurality of the solenoid valves are mounted in such a manner as to be arranged in a row by using mounting screws. A first insertion hole and a second insertion hole that allow the mounting screws to be inserted through the first insertion hole and the second insertion hole are formed in the valve body in such a manner as to be paired with each other and to extend in the height direction of the valve body. A plurality of first mounting holes and a plurality of second mounting holes are formed in the valve-mounting surfaces in such a manner that each of the first mounting holes and a corresponding one of the second mounting holes are paired with each other and that each of the first mounting holes corresponds to the first insertion hole and enables the solenoid valve to be mounted onto a corresponding one of the valve-mounting surfaces as a result of one of the mounting screws being screwed into the first mounting hole, and each of the second mounting holes corresponds to the second insertion hole and enables the solenoid valve to be mounted onto a corresponding one of the valve-mounting surfaces as a result of one of the mounting screws being screwed into the second mounting hole. The valve body has a first side surface and a second side surface that extend in the longitudinal direction of the valve body and that are parallel to each other. A first ridge extending along the first insertion hole and a first recessed groove extending parallel to the first ridge are formed on and in the first side surface, and a second ridge and a second recessed groove are formed on and in the second side surface, the second ridge extending along the second insertion hole at a position corresponding to the first recessed groove, the second recessed groove extending parallel to the second ridge at a position corresponding to the first ridge. The first recessed groove is formed in such a manner as to be capable of accommodating the second ridge of another solenoid valve that is adjacent to the first side surface of the solenoid valve, and the second recessed groove is formed in such a manner as to be capable of accommodating the first ridge of another solenoid valve that is adjacent to the second side surface of the solenoid valve. The first insertion hole and the second insertion hole are formed in the valve body in such a manner that a portion of the first insertion hole and a portion of the second insertion hole in a diametrical direction respectively extend through the inside of the first ridge and the inside of the second ridge. The first and second insertion holes and the first and second recessed grooves are formed in such a manner that, on a plane that is perpendicular to the first side surface and the second side surface and that includes an axis of the spool-sliding hole, the shortest distance from the axis of the spool-sliding hole to a hole wall surface of the first insertion hole, the shortest distance from the axis of the spool-sliding hole to a hole wall surface of the second insertion hole, the distance from the axis of the spool-sliding hole to a bottom wall surface of the first recessed groove, and the distance from the axis of the spool-sliding hole to a bottom wall surface of the second recessed groove are equal to one another.

In addition, a manifold-type solenoid valve assembly according to another aspect of the present invention is a manifold-type solenoid valve assembly including a solenoid valve including a valve body that has a longitudinal direction, a transverse direction, and a height direction and in which a spool-sliding hole extending through the valve body in the longitudinal direction is formed and a spool that is slidably inserted in the spool-sliding hole and a manifold base having a plurality of valve-mounting surfaces onto which a plurality of the solenoid valves are mounted in such a manner as to be arranged in a row by using mounting screws. A first insertion hole and a second insertion hole that allow the mounting screws to be inserted through the first insertion hole and the second insertion hole are formed in the valve body in such a manner as to be paired with each other and to extend in the height direction of the valve body. A plurality of first mounting holes and a plurality of second mounting holes are formed in the valve-mounting surfaces in such a manner that each of the first mounting holes and a corresponding one of the second mounting holes are paired with each other and that each of the first mounting holes corresponds to the first insertion hole and enables the solenoid valve to be mounted onto a corresponding one of the valve-mounting surfaces as a result of one of the mounting screws being screwed into the first mounting hole, and each of the second mounting holes corresponds to the second insertion hole and enables the solenoid valve to be mounted onto a corresponding one of the valve-mounting surfaces as a result of one of the mounting screws being screwed into the second mounting hole. The valve body has a first side surface and a second side surface that extend in the longitudinal direction of the valve body and that are parallel to each other. A first ridge extending along the first insertion hole and a first recessed groove extending parallel to the first ridge are formed on and in the first side surface, and a second ridge and a second recessed groove are formed on and in the second side surface, the second ridge extending along the second insertion hole at a position corresponding to the first recessed groove, the second recessed groove extending parallel to the second ridge at a position corresponding to the first ridge. The first recessed groove is formed in such a manner as to be capable of accommodating the second ridge of another solenoid valve that is adjacent to the first side surface of the solenoid valve, and the second recessed groove is formed in such a manner as to be capable of accommodating the first ridge of another solenoid valve that is adjacent to the second side surface of the solenoid valve. The first insertion hole and the second insertion hole are formed in the valve body in such a manner that a portion of the first insertion hole and a portion of the second insertion hole in a diametrical direction respectively extend through the inside of the first ridge and the inside of the second ridge. When a height from the first side surface to a top surface of the first ridge and a height from the second side surface to a top surface of the second ridge are each denoted by $h1$, a depth from the first side surface to a bottom wall surface of the first recessed groove and a depth from the second side surface to a bottom wall surface of the second recessed groove are each denoted by $h2$, a minimum wall thickness between a hole wall surface of the first insertion hole and the top surface of the first ridge and a minimum wall thickness between a hole wall surface of the second insertion hole and the top surface of the second ridge are each denoted by $c$, and a diameter of the first insertion hole and a diameter of the second insertion hole are each denoted by $d$, a dimensional relationship between these values satisfies the following formulas:

$c+d-h1=h2$ and $h1>h2$.

A cross-sectional shape of the spool-sliding hole in a direction perpendicular to the axis of the spool-sliding hole may be a long hole shape having a long axis oriented in the height direction of the valve body and a short axis oriented in the transverse direction of the valve body.

As an example, the cross-sectional shape is a shape having left and right hole side walls, which extend linearly in a direction in which the long axis extends and which are parallel to each other, upper and lower hole end walls, the upper hole end wall connecting first ends of the left and right hole side walls to each other, the lower hole end wall connecting second ends of the left and right hole side walls to each other, or an elliptical shape.

Advantageous Effects of Invention

According to the present invention, on a plane that is perpendicular to a first side surface and a second side surface and that includes the axis of a sliding hole, the shortest distance from the axis of the spool-sliding hole to a hole wall surface of a first insertion hole, the shortest distance from the axis of the spool-sliding hole to a hole wall surface of a second insertion hole, the distance from the axis of the spool-sliding hole to a bottom wall surface of a first recessed groove, and the distance from the axis of the spool-sliding hole to a bottom wall surface of a second recessed groove are equal to one another, and thus, the hole diameter of the spool-sliding hole can be efficiently increased with respect to the width of a valve body.

DESCRIPTION OF EMBODIMENTS

A solenoid valve and a manifold-type solenoid valve assembly according to an embodiment of the present invention will be described in detail below.

As illustrated in FIG. 1 to FIG. 5, a solenoid valve 2 according to the present invention includes a main valve portion 14 with a spool 16 built therein, the spool 16 being used for switching flow paths, and a solenoid-controlled pilot valve 15 that operates the spool 16, and a plurality of the solenoid valves 2 are mounted onto a manifold base 1 in such a manner as to be arranged in a row, so that the above-mentioned manifold-type solenoid valve assembly 50 is formed.

Figure 2:
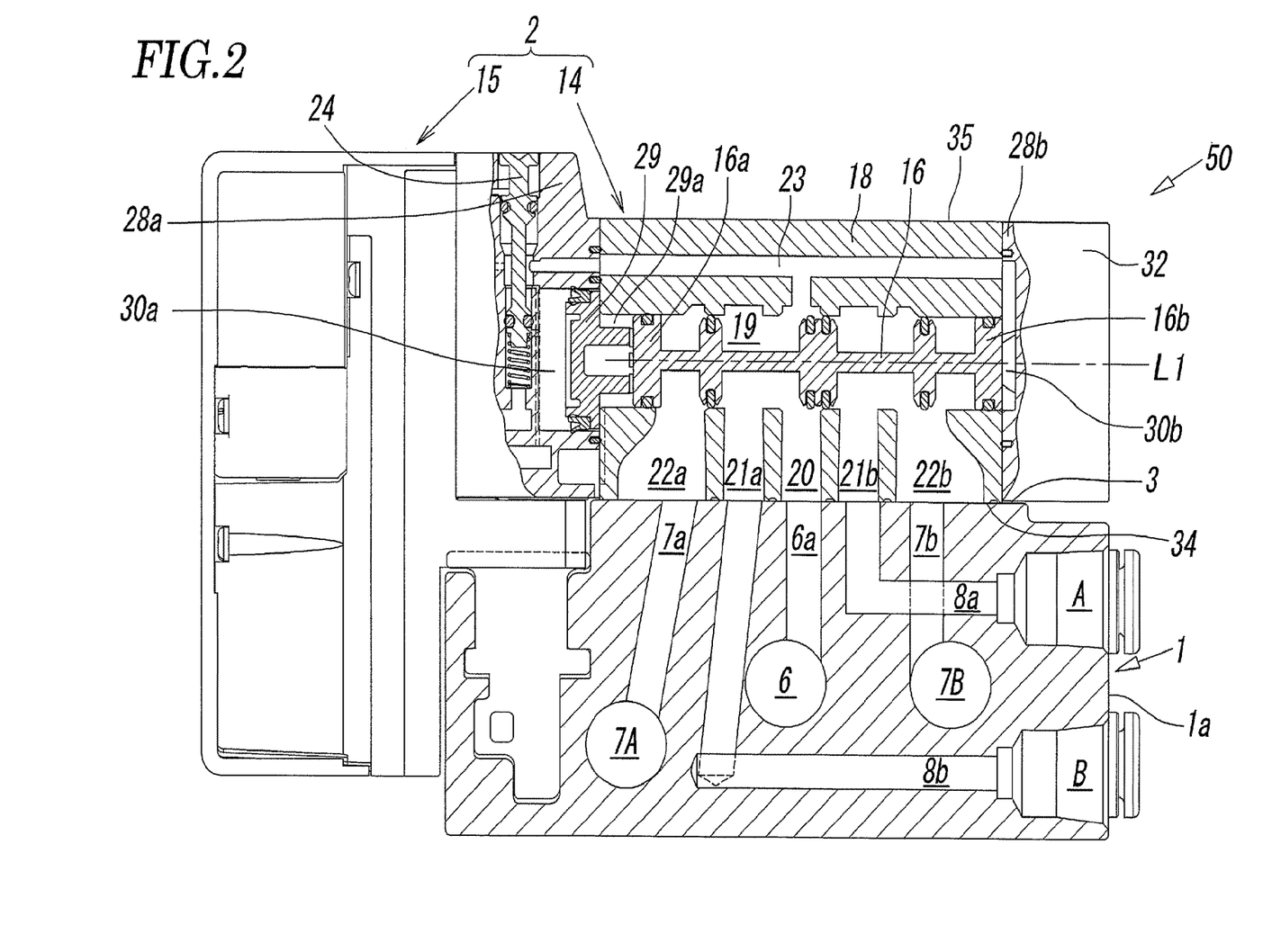
FIG. 2 is a sectional view of FIG. 1.

The above-mentioned manifold base 1 is formed of a block that is long in one direction and whose cross section has a rectangular shape or the like, and the solenoid valves 2 are mounted on a plurality of flat valve-mounting surfaces 3 (see FIG. 4) that are formed on the top surface of the manifold base 1. In the manifold base 1, as illustrated in FIG. 2, fluid flow paths 6, 7A, and 7B that are used for collectively supplying and collectively discharging a pressure fluid are formed in such a manner as to extend through the manifold base 1 from one end toward the other end of the manifold base 1 in the longitudinal direction of the manifold base 1, and branch holes 6a that branch off from the fluid flow path 6, branch holes 7a that branch off from the fluid flow path 7A, and branch holes 7b that branch off from the fluid flow path 7B are open to the above-mentioned mounting surfaces 3. In FIG. 2, the first fluid flow path 6 that is positioned in the middle among the fluid flow paths is used for collectively supplying the pressure fluid, and the second and third fluid flow paths 7A and 7B that are located on either side of the first fluid flow path 6 are used for collectively discharging the pressure fluid. The above-mentioned first fluid flow path 6 extends, in a direction parallel to the direction in which the solenoid valves 2 are arranged in a row, in a center portion of the manifold base 1 in the longitudinal direction of the manifold base 1, and the above-mentioned second and third fluid flow paths 7A and 7B are located on either side of the first fluid flow path 6 and extend parallel to the first fluid flow path 6. In the present embodiment, the above-mentioned pressure fluid is compressed air.

Figure 4:
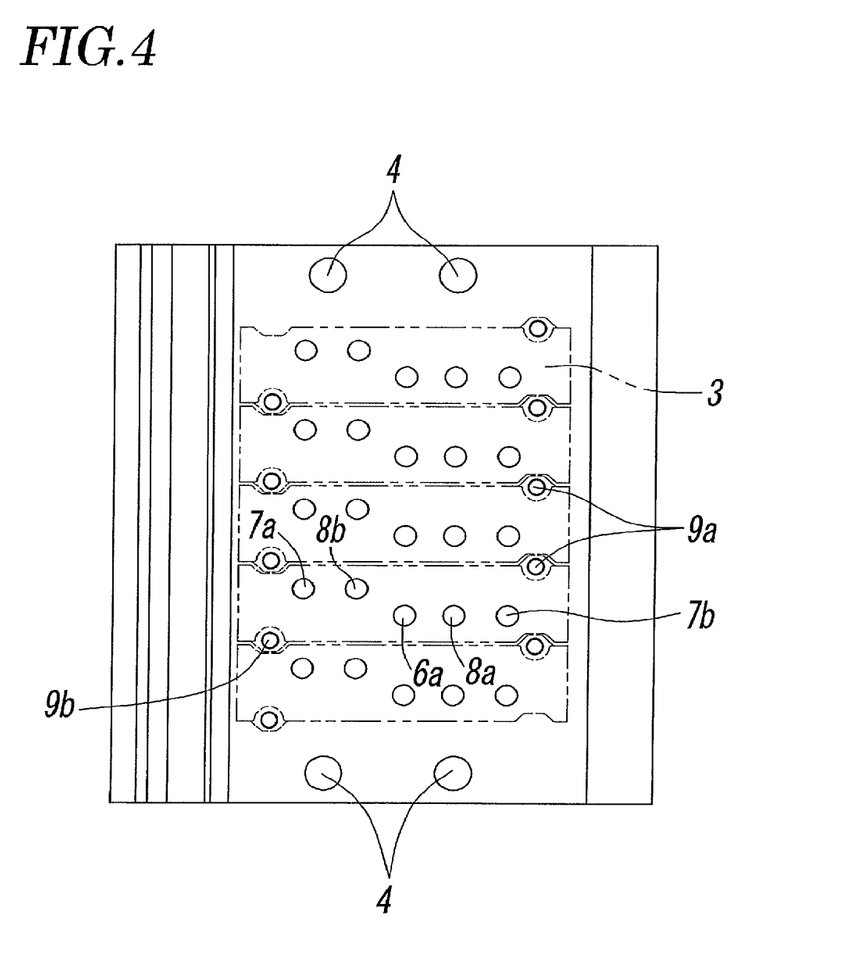
FIG. 4 is a plan view of the manifold-type solenoid valve assembly in a state in which the solenoid valves have been removed therefrom.

As illustrated in FIG. 4, a pair of first and second mounting holes 9a and 9b are formed in each of the above-mentioned valve-mounting surfaces 3 in such a manner as to correspond to first and second insertion holes 45 and 46, which will be described later, the pair of first and second mounting holes 9a and 9b being formed of threaded bores into which mounting screws 47 for mounting the solenoid valve 2 can be screwed. Fixing holes 4 that are used for installing the manifold base 1 onto a peripheral device by using, for example, bolts or screws are formed in the manifold base 1.

Figure 1:
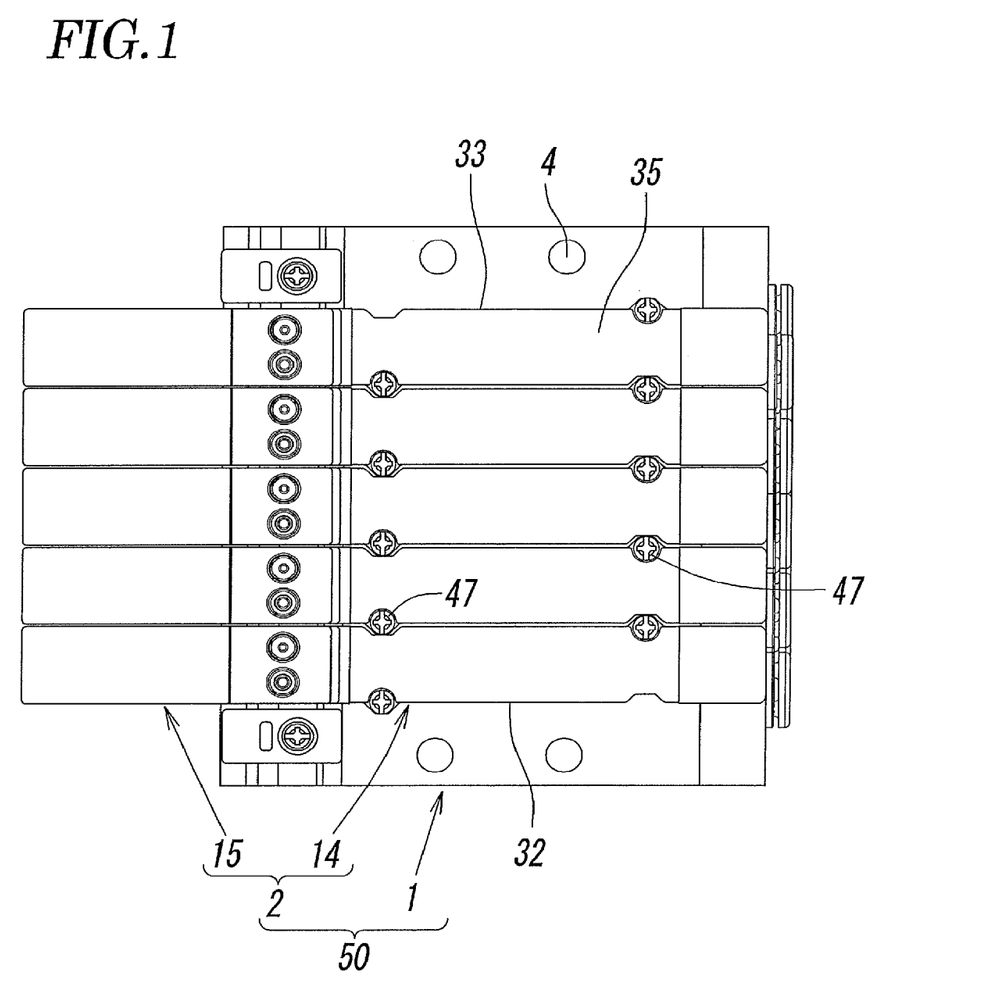
FIG. 1 is a plan view of a manifold-type solenoid valve assembly that includes solenoid valves according to the present invention.
Figure 3:
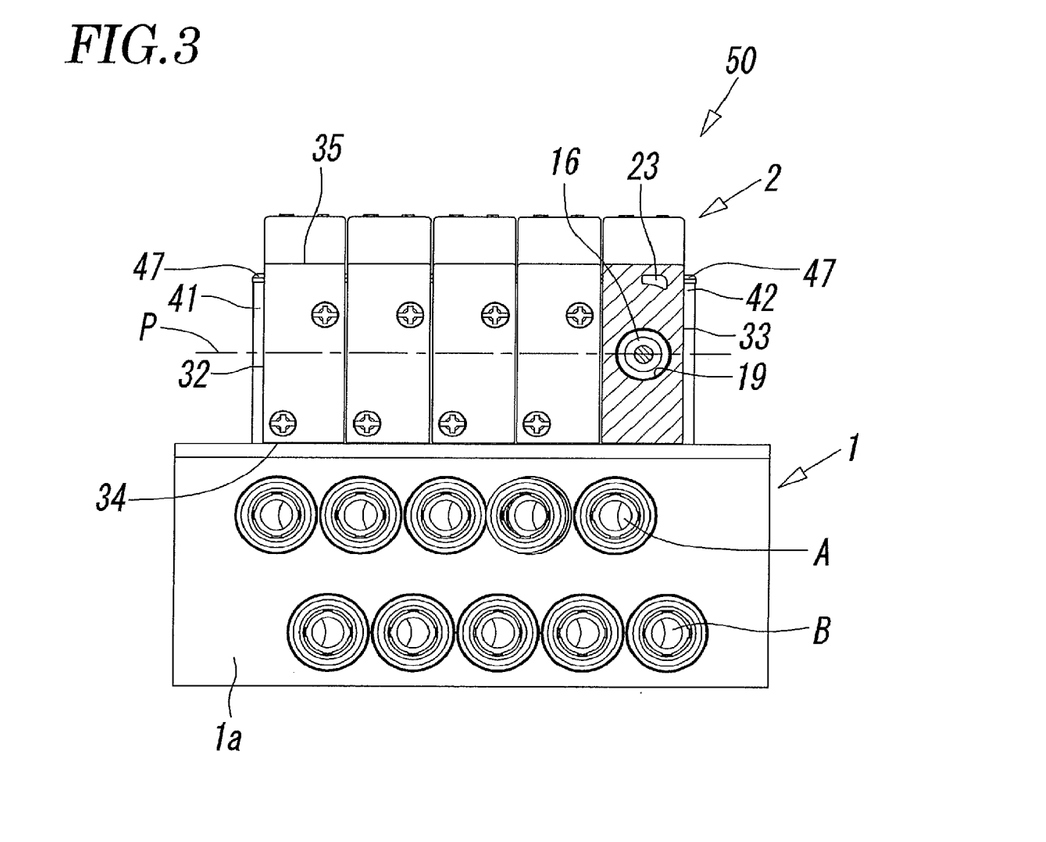
FIG. 3 is a side view of the manifold-type solenoid valve assembly, the side view illustrating the cross section of one of the solenoid valves illustrated in FIG. 1.

In contrast, as is clear from FIG. 1 to FIG. 3, a valve body 18 of the above-mentioned main valve portion 14 is formed in a substantially rectangular parallelepiped shape having a longitudinal direction, a transverse direction, and a height direction. In addition, a spool-sliding hole 19 in which the spool 16 is slidably accommodated is formed in the valve body 18 in such a manner as to extend through the valve body in the longitudinal direction. The cross-sectional shape of the spool-sliding hole 19 in a direction perpendicular to an axis L1 of the spool-sliding hole 19 is a circular shape.

One fluid-supply communication hole 20, two output communication holes 21a and 21b, which are located on either side of the fluid-supply communication hole 20, and two discharge communication holes 22a and 22b, which are respectively adjacent to the output communication holes 21a and 21b, are open to the spool-sliding hole 19, and flow paths between the corresponding communication holes 20 to 22b are to be switched by the above-mentioned spool 16. In the valve body 18, a pilot path 23 that enables a pilot fluid for driving the corresponding spool 16 to flow therethrough is formed in such a manner as to be parallel to the spool-sliding hole 19 in the longitudinal direction of the valve body 18, and the pilot path 23 communicates with the communication hole 20.

Figure 5:
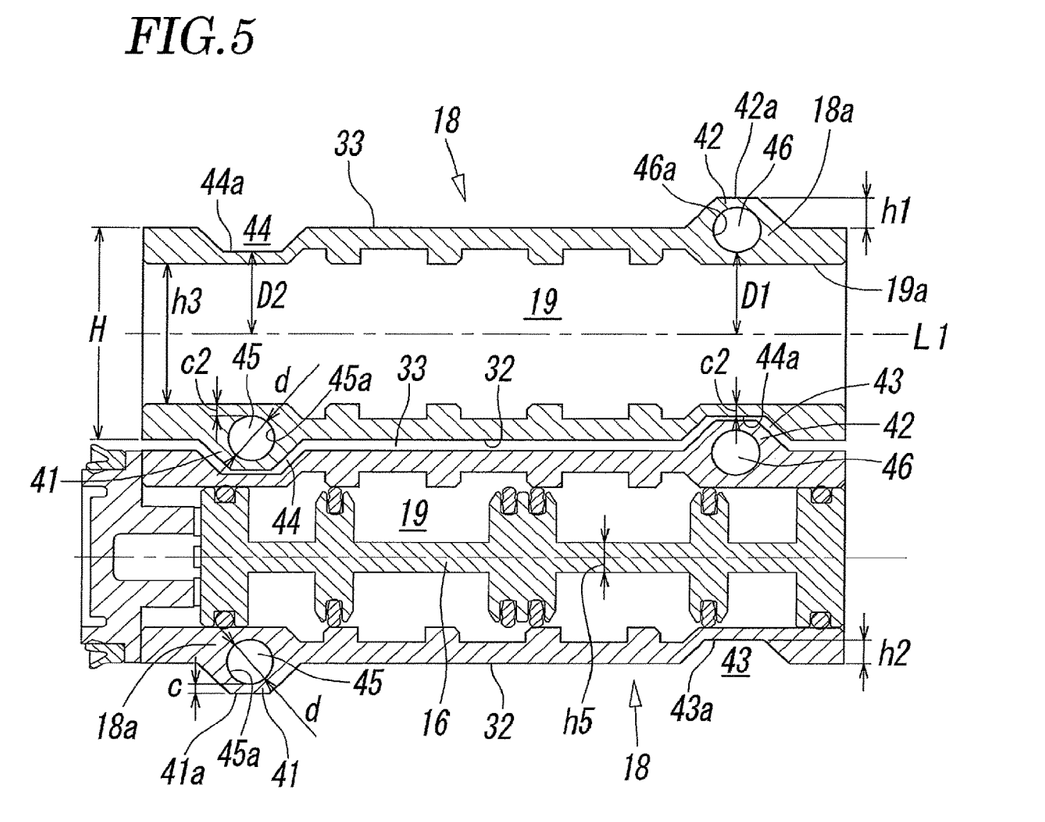
FIG. 5 is a cross-sectional view illustrating the adjacent solenoid valves in a state in which a spool is removed from one of the solenoid valves.

Referring to FIG. 5, the above-mentioned valve body 18 has a first side surface 32, a second side surface 33, a bottom surface 34, and a top surface 35 (FIG. 2) each extending along the axis L1 of the spool-sliding hole 19, the first side surface 32 and the second side surface 33 being parallel to each other, and the bottom surface 34 and the top surface 35 being parallel to each other.

The above-mentioned bottom surface 34 is formed so as to have a substantially rectangular shape and to be substantially flat in order to be mounted onto one of the valve-mounting surfaces 3 of the above-mentioned manifold base 1, and the supply communication hole 20 is open at the center of the bottom surface 34. The discharge communication holes 22a and 22b are open at positions on either side of the communication hole 20 in such a manner as to be substantially symmetric to each other with respect to the communication hole 20. The positions at which the communication holes 20, 22a, and 22b are open are positions at which, when the solenoid valve 2 is mounted on one of the valve-mounting surfaces 3, the communication holes 20, 22a, and 22b respectively communicate with the corresponding branch holes 6a, 7a, and 7b.

Pairs of first and second output ports A and B that are used for outputting the pressure fluid from the above-mentioned solenoid valves 2 are formed in a side surface 1a of the above-mentioned manifold base 1 in the transverse direction of the manifold base 1, the number of the pairs of first and second output ports A and B being the same as the number of the above-mentioned solenoid valves 2. In addition, the above-mentioned first output ports A and the above-mentioned second output ports B respectively communicate with output communication holes 8a and output communication holes 8b, and the output communication holes 8a and 8b are open to the above-mentioned mounting surfaces 3 in such a manner that each of the output communication holes 8a is located between one of the branch holes 6a and a corresponding one of the branch holes 7a and that each of the output communication holes 8b is located between one of the branch holes 6a and a corresponding one of the branch holes 7b. When the above-mentioned solenoid valves 2 are mounted on the above-mentioned mounting surfaces 3, the output communication holes 8a communicate with the above-mentioned output communication holes 21b, and the output communication holes 8b communicate with the above-mentioned output communication holes 21a.

A first piston cover 28a and a second piston cover 28b are attached to the end portions of the valve body 18 in the longitudinal direction of the valve body 18, that is, the first piston cover 28a and the second piston cover 28b are respectively positioned at a first end and a second end of the spool-sliding hole 19 in a direction in which the axis L1 of the spool-sliding hole 19 extends. A piston chamber 29a is formed between the first piston cover 28a and the spool 16, and a piston 29 that is brought into contact with a first end portion 16a of the spool 16 is disposed in the piston chamber 29a. A pressure chamber 30a is formed on one side of the piston 29. A pressure chamber 30b to which the pilot fluid, which is used for causing the above-mentioned spool 16 to return to its original position, is constantly supplied is formed between the second piston cover 28b and the spool 16, and the pressure chamber 30b communicates with the above-mentioned communication hole 20 via the pilot path 23. No piston is disposed in the above-mentioned pressure chamber 30b, and a second end portion 16b of the above-mentioned spool 16 serves as a piston.

Note that the reference numeral 24 in FIG. 2 denotes an operating element for manual operation, and the operating element is used for manually reproducing the state where current is applied to the above-mentioned pilot valve 15.

First and second ridges 41 and 42 and first and second recessed grooves 43 and 44 that are formed on and in the valve body 18 will now be described. The first ridge 41 extending in the height direction of the valve body 14 and the first recessed groove 43 extending parallel to the first ridge 41 are formed on and in the first side surface 32 of the above-mentioned valve body 14. The second ridge 42 and the second recessed groove 44 are formed on and in the second side surface 33 of the above-mentioned valve body 14, the second ridge 42 extending in the height direction of the valve body 14 at a position corresponding to the first recessed groove 43 and the second recessed groove 44 extending parallel to the second ridge 42 at a position corresponding to the first ridge 41.

The first and second ridges 41 and 42 and the first and second recessed grooves 43 and 44 each have a transverse cross-sectional shape resembling an isosceles trapezoid from which the lower base thereof has been removed, and top surfaces 41a and 42a of the first and second ridges 41 and 42 and bottom wall surfaces 43a and 44a of the first and second recessed grooves 43 and 44 are flat and parallel to the first and second side surfaces 32 and 33. The height of each of the first and second ridges 41 and 42 is slightly higher than the depth of each of the first and second recessed grooves 43 and 44. Thus, when the plurality of solenoid valves 2 are mounted on the manifold base 1 in such a manner as to be arranged in a row, the second ridge 42 and the first ridge 41 of each of the solenoid valves 2 are respectively accommodated in the first recessed groove 43 and the second recessed grooves 44 of one of the other solenoid valves 2 that is adjacent to the solenoid valve 2, and a small gap is generated between two corresponding adjacent solenoid valves 2 and 2.

In the valve body 18, the first and second insertion holes 45 and 46 into which the mounting screws 47 can be screwed are formed along the first and second ridges 41 and 42, respectively. The first insertion hole 45 is formed in such a manner as to extend to both the first ridge 41 and a frame body portion 18a of the valve body 18, and the second insertion hole 46 is formed in such a manner as to extend to both the second ridge 42 and the frame body portion 18a of the valve body 18. In other words, the first insertion hole 45 and the second insertion hole 46 are formed in such a manner that, in the diametrical direction of the first insertion hole 45, half of the first insertion hole 45 extends through the inside of the first ridge 41 while the other half of the first insertion hole 45 extends through the inside of the frame body portion 18a of the valve body 18 excluding the above-mentioned first ridge 41 and that, in the diametrical direction of the second insertion hole 46, half of the second insertion hole 46 extends through the inside of the second ridge 42 while the other half of the second insertion hole 46 extends through the inside of the frame body portion 18a of the valve body 18 excluding the above-mentioned second ridge 42.

The positional relationship between the first and second ridges 41 and 42, the first and second recessed grooves 43 and 44, and the first and second insertion holes 45 and 46 of the solenoid valve 2 will now be described. On a plane P that is perpendicular to the first side surface 32 and the second side surface 33 and that includes the axis L1 of the spool-sliding hole 19, when the distance between a portion of a hole wall surface 45a of the first insertion hole 45, the portion being closest to the spool-sliding hole 19, and the axis L1 and the distance between a portion of a hole wall surface 46a of the second insertion hole 46, the portion being closest to the spool-sliding hole 19, and the axis L1 are each denoted by D1, and the distance between the bottom wall surface 43a of the first recessed groove 43 and the above-mentioned axis L1 and the distance between the bottom wall surface 44a of the second recessed groove 44 and the above-mentioned axis L1 are each denoted by D2, the first and second recessed grooves 43 and 44 and the first and second insertion holes 45 and 46 are formed in the valve body 18 while maintaining the positional relationship in which the above-mentioned distances D1 and D2 are equal to each other.

In the case of forming the spool-sliding hole 19 in the valve body 18, when the above-mentioned distances D1 and D2 are different from each other, the diameter of the spool-sliding hole 19 needs to be set so as to correspond to one of the distances that is shorter. Consequently, in the case where the distance D1 is longer than the distance D2, the thickness between a side wall 19a of the spool-sliding hole 19 and each of the hole wall surfaces 45a and 46a of the first and second insertion holes 45 and 46 becomes unnecessarily large. In the case where the distance D2 is longer than the distance D1, the thickness between the side wall 19a of the spool-sliding hole 19 and each of the bottom wall surfaces 43a and 44a of the first and second recessed grooves 43 and 44 becomes unnecessarily large. Therefore, by setting the above-mentioned distances D1 and D2 to be equal to each other, the above-mentioned thickness can be prevented from becoming unnecessarily large, and as a result, the hole diameter of the spool-sliding hole 19 can be efficiently increased with respect to a width H of the valve body 18.

On the above-mentioned plane P, when the distance between the side wall 19a of the spool-sliding hole 19 and each of the bottom wall surfaces 43a and 44a of the first and second recessed grooves 43 and 44 and the distance between the side wall 19a and each of the hole wall surfaces 45a and 46a of the first and second insertion holes 45 and 46 are each denoted by c2, a diameter h3 of the spool-sliding hole 19 may be expressed by the following formula (1).

$$h3 = 2 \times (D1-c2) = 2 \times (D2-c2) \tag{1}$$

Figure 6:
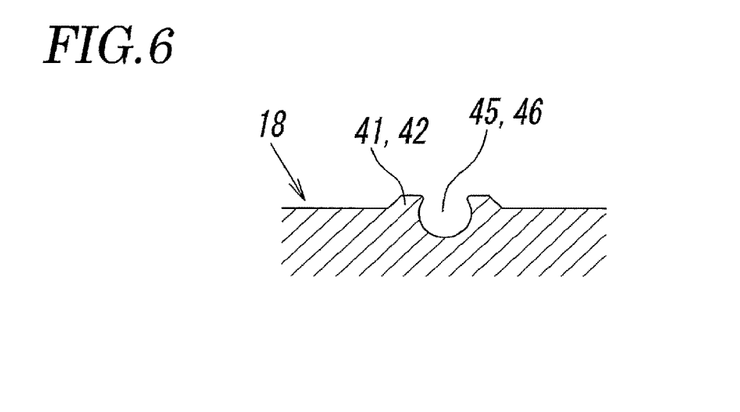
FIG. 6 is a diagram illustrating another form of first and second insertion holes extending through first and second ridges.

Note that, although the first insertion hole 45, which is illustrated in FIG. 5, is formed at a position spaced apart from the top surface 41a of the first ridge 41 by the distance c2, and the second insertion hole 46, which is illustrated in FIG. 5, is formed at a position spaced apart from the top surface 42a of the first ridge 42 by the distance c2, the first and second insertion holes 45 and 46 are not necessarily formed at such positions, and for example, as illustrated in FIG. 6, the first insertion hole 45 may be formed at a position at which a portion of the hole wall surface 45a is open to the above-mentioned top surface 41a, and the second insertion hole 46 may be formed at a position at which a portion of the hole wall surface 46a is open to the above-mentioned top surface 42a. In this case, it is desirable that the transverse cross-sectional shape of each of the first and second insertion holes 45 and 46 be a major arc shape.

In addition, on the above-mentioned plane P, when the distance between the first side surface 32 and the top surface 41a of the first ridge 41 and the distance between the second side surface 33 and the top surface 42a of the second ridge 42 (the height of each of the first and second ridges 41 and 42) are each denoted by h1, the distance from the first side surface 32 to the bottom wall surface 43a of the first recessed groove 43 and the distance from the second side surface 33 to the bottom wall surface 44a of the second recessed groove 44 (the depth of each of the first and second recessed grooves 43 and 44) are each denoted by h2, the distance between the above-mentioned top surface 41a and the hole wall surface 45a of the first insertion hole 45 and the distance between the above-mentioned top surface 42a and the hole wall surface 46a of the second insertion hole 46 are each denoted by c, and the diameter of each of the first and second insertion holes 45 and 46 is denoted by d, the following formula (2) is satisfied.

$$c + d - h1 = h2 \tag{2}$$

Here, the groove depth h2 of each of the first and second recessed grooves 43 and 44 is set to be smaller than the height h1 of each of the first ridges 41 and 42 by a value α, and thus, the following formula (3) may be obtained by substituting h2=h1−α into the formula (2).

$$h1=(\alpha+c+d)/2 \qquad (3)$$

As described above, the solenoid valve 2 according to the present embodiment is configured in such a manner that the above formula (1) is satisfied or configured in such a manner that the above formula (2) or the above formula (3) is satisfied, and thus, the diameter of the spool-sliding hole 19 can be increased with respect to the width of the valve body 18.

The manifold-type solenoid valve assembly 50 according to the present invention will now be described. As illustrated in FIG. 3, the manifold-type solenoid valve assembly 50 according to the present invention includes a plurality of the above-described solenoid valves 2 and the above-described manifold base 1, and the solenoid valves 2 are mounted on the valve-mounting surfaces 3 of the manifold base 1 by using the mounting screws 47. Since each of the solenoid valves 2 included in the manifold-type solenoid valve assembly 50 has a configuration the same as the configuration of the above-described solenoid valve 2, and the manifold base 1 included in the manifold-type solenoid valve assembly 50 has a configuration the same as the configuration of the above-described manifold 1, descriptions of these configurations will be omitted.

Figure 7:
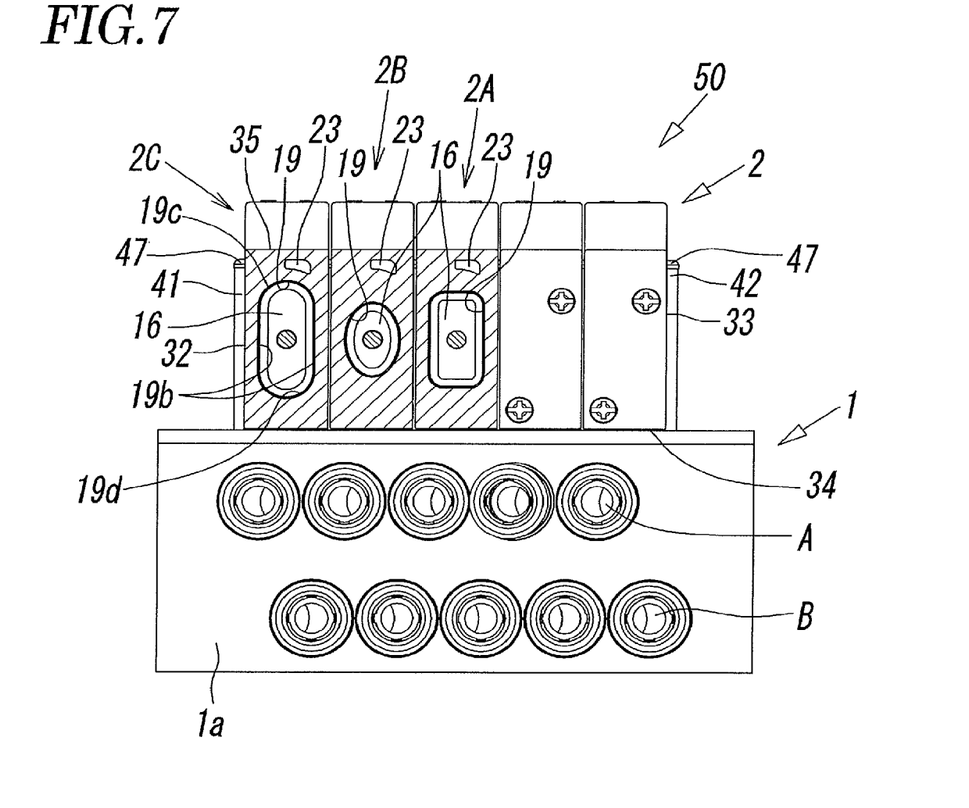
FIG. 7 is a diagram illustrating the cross-sectional shapes of spool-sliding holes, each of which is formed in an elongated shape.

In addition, in the above-described solenoid valve 2 and the above-described manifold-type solenoid valve assembly 50, although the cross-sectional shape of the spool-sliding hole 19 in the direction perpendicular to the axis L1 is a circular shape, the cross-sectional shape may be a long hole shape, such as that illustrated in FIG. 7, that has a long axis oriented in the height direction of the valve body 18 and a short axis oriented in the transverse direction. Examples of this long hole shape includes a rectangular shape such as that illustrated in a solenoid valve 2A, an elliptical shape such as that illustrated in a solenoid valve 2B, and a racetrack-like shape, such as that illustrated in a solenoid valve 2C, having left and right hole side walls 19b, which extend linearly in the long-axis direction and which are parallel to each other, an upper hole end wall 19c, which connects first ends of the left and right hole side walls 19b to each other, and a lower hole end wall 19d, which connects second ends of the left and right hole side walls 19b to each other. In this case, the cross-sectional shape of a land portion included in the spool 16 is the same as the cross-sectional shape of the spool-sliding hole 19.

Even in the case of the spool-sliding hole 19 whose cross section has a long hole shape as described above, by forming the solenoid valves 2A to 2C that satisfy the above formula (1) or the above formula (2) or (3), the hole diameter of the spool-sliding hole can be efficiently increased with respect to the width of the body as in the case of the spool-sliding hole 19 whose cross section has a circular shape.

Although the solenoid valve and the manifold-type solenoid valve assembly according to the embodiment of the present invention have been described in detail, the present invention is not limited to the above-described embodiment, and various design changes can be made within the gist of the present invention. For example, in the above-described embodiment, although the cross-sectional shapes of the first and second ridges 41 and 42 in the transverse direction and the groove shapes of the first and second recessed grooves 43 and 44 are each a trapezoidal shape, each of these shapes may be, for example, an angular U shape formed of two short sides and one long side of a rectangle or a V shape formed of two oblique sides of a triangle as long as the shapes are similar to one another so that positioning of the solenoid valve 2 to be mounted onto the manifold base 1 can be performed.

REFERENCE SIGNS LIST 1 manifold base
2, 2A, 2B, 2C solenoid valve
3 valve-mounting surface
9a first mounting hole
9b second mounting hole
16 spool
18 valve body
19 spool-sliding hole
19b left and right hole side walls
19c upper hole end wall
19d lower hole end wall
32 first side surface
33 second side surface
41 first ridge
42 second ridge
43 first recessed groove
43a bottom wall surface
44 second recessed groove
44a bottom wall surface
45 first insertion hole
45a hole wall surface
46 second insertion hole
46a hole wall surface
50 manifold-type solenoid valve assembly
L1 axis (of spool-sliding hole)
P plane
D1, D2 distance

The invention claimed is:

1. A solenoid valve that is to be mounted onto a manifold base by using mounting screws such that a plurality of the solenoid valves are arranged in a row, the solenoid valve comprising:
 a valve body that has a longitudinal direction, a transverse direction, and a height direction;
 a spool-sliding hole extending through the valve body in the longitudinal direction is formed; and
 a spool that is slidably inserted in the spool-sliding hole,
 wherein the valve body has a first side surface and a second side surface that extend in the longitudinal direction of the valve body and that are parallel to each other,
 wherein a first ridge extending in the height direction of the valve body and a first recessed groove extending parallel to the first ridge are formed on and in the first side surface, and a second ridge and a second recessed groove are formed on and in the second side surface, the second ridge extending in the height direction of the valve body at a position corresponding to the first recessed groove, the second recessed groove extending parallel to the second ridge at a position corresponding to the first ridge,
 wherein the first recessed groove is formed so as to be capable of accommodating the second ridge of another solenoid valve that is adjacent to the first side surface of the solenoid valve, and the second recessed groove is formed so as to be capable of accommodating the first ridge of another solenoid valve that is adjacent to the second side surface of the solenoid valve,
 wherein the valve body has a first insertion hole that is formed along the first ridge and that allows one of the mounting screws to be inserted through the first insertion hole and a second insertion hole that is formed along the second ridge and that allows one of the mounting screws to be inserted through the second insertion hole, wherein the first insertion hole and the second insertion hole are formed in the valve body such that a portion of the first insertion hole and a portion of the second insertion hole in a diametrical direction respectively extend through the inside of the first ridge and the inside of the second ridge, and wherein the first and second insertion holes and the first and second recessed grooves are formed such that, on a plane that is perpendicular to the first side surface and the second side surface and that includes an axis of the spool-sliding hole, the shortest distance from the axis of the spool-sliding hole to a hole wall surface of the first insertion hole, the shortest distance from the axis of the spool-sliding hole to a hole wall surface of the second insertion hole, the distance from the axis of the spool-sliding hole to a bottom wall surface of the first recessed groove, and the distance from the axis of the spool-sliding hole to a bottom wall surface of the second recessed groove are equal to one another.

2. The solenoid valve according to claim 1,
wherein a cross-sectional shape of the spool-sliding hole in a direction perpendicular to the axis of the spool-sliding hole is a non-circular hole shape having a first axis oriented in the height direction of the valve body and a second axis oriented in the transverse direction of the valve body, the first axis being longer than the second axis.

3. The solenoid valve according to claim 2,
wherein the cross-sectional shape is a shape having left and right hole side walls, which extend linearly in a direction in which the first axis extends and which are parallel to each other, upper and lower hole end walls, the upper hole end wall connecting first ends of the left and right hole side walls to each other, the lower hole end wall connecting second ends of the left and right hole side walls to each other, or an elliptical shape.

4. A solenoid valve that is to be mounted onto a manifold base by using mounting screws such that a plurality of the solenoid valves are arranged in a row, the solenoid valve comprising:
a valve body that has a longitudinal direction, a transverse direction, and a height direction;
a spool-sliding hole extending through the valve body in the longitudinal direction is formed; and
a spool that is slidably inserted in the spool-sliding hole,
wherein the valve body has a first side surface and a second side surface that extend in the longitudinal direction of the valve body and that are parallel to each other,
wherein a first ridge extending in the height direction of the valve body and a first recessed groove extending parallel to the first ridge are formed on and in the first side surface, and a second ridge and a second recessed groove are formed on and in the second side surface, the second ridge extending in the height direction of the valve body at a position corresponding to the first recessed groove, the second recessed groove extending parallel to the second ridge at a position corresponding to the first ridge,
wherein the first recessed groove is formed so as to be capable of accommodating the second ridge of another solenoid valve that is adjacent to the first side surface of the solenoid valve, and the second recessed groove is formed so as to be capable of accommodating the first ridge of another solenoid valve that is adjacent to the second side surface of the solenoid valve, wherein the valve body has a first insertion hole that is formed along the first ridge and that allows one of the mounting screws to be inserted through the first insertion hole and a second insertion hole that is formed along the second ridge and that allows one of the mounting screws to be inserted through the second insertion hole, wherein the first insertion hole and the second insertion hole are formed in the valve body such that a portion of the first insertion hole and a portion of the second insertion hole in a diametrical direction respectively extend through the inside of the first ridge and the inside of the second ridge, and wherein, when a height from the first side surface to a top surface of the first ridge and a height from the second side surface to a top surface of the second ridge are each denoted by h1, a depth from the first side surface to a bottom wall surface of the first recessed groove and a depth from the second side surface to a bottom wall surface of the second recessed groove are each denoted by h2, a minimum wall thickness between a hole wall surface of the first insertion hole and the top surface of the first ridge and a minimum wall thickness between a hole wall surface of the second insertion hole and the top surface of the second ridge are each denoted by c, and a diameter of the first insertion hole and a diameter of the second insertion hole are each denoted by d, a dimensional relationship between these values satisfies the following formulas:

$$c+d-h1=h2 \text{ and}$$

$$h1>h2.$$

5. The solenoid valve according to claim 4,
wherein a cross-sectional shape of the spool-sliding hole in a direction perpendicular to the axis of the spool-sliding hole is a non-circular hole shape having a first axis oriented in the height direction of the valve body and a second axis oriented in the transverse direction of the valve body, the first axis being longer than the second axis.

6. The solenoid valve according to claim 5,
wherein the cross-sectional shape is a shape having left and right hole side walls, which extend linearly in a direction in which the first axis extends and which are parallel to each other, upper and lower hole end walls, the upper hole end wall connecting first ends of the left and right hole side walls to each other, the lower hole end wall connecting second ends of the left and right hole side walls to each other, or an elliptical shape.

7. A manifold solenoid valve assembly comprising:
a solenoid valve including a valve body that has a longitudinal direction, a transverse direction, and a height direction and in which a spool-sliding hole extending through the valve body in the longitudinal direction is formed and a spool that is slidably inserted in the spool-sliding hole; and
a manifold base having a plurality of valve-mounting surfaces onto which a plurality of the solenoid valves are mounted so as to be arranged in a row by using mounting screws,
wherein a first insertion hole and a second insertion hole that allow the mounting screws to be inserted through the first insertion hole and the second insertion hole are formed in the valve body so as to be paired with each other and to extend in the height direction of the valve body, wherein a plurality of first mounting holes and a plurality of second mounting holes are formed in the valve-mounting surfaces such that each of the first mounting holes and a corresponding one of the second mounting holes are paired with each other and that each of the first mounting holes corresponds to the first insertion hole and enables the solenoid valve to be mounted onto a corresponding one of the valve-mounting surfaces as a result of one of the mounting screws being screwed into the first mounting hole, and each of the second mounting holes corresponds to the second insertion hole and enables the solenoid valve to be mounted onto a corresponding one of the valve-mounting surfaces as a result of one of the mounting screws being screwed into the second mounting hole, wherein the valve body has a first side surface and a second side surface that extend in the longitudinal direction of the valve body and that are parallel to each other, wherein a first ridge extending along the first insertion hole and a first recessed groove extending parallel to the first ridge are formed on and in the first side surface, and a second ridge and a second recessed groove are formed on and in the second side surface, the second ridge extending along the second insertion hole at a position corresponding to the first recessed groove, the second recessed groove extending parallel to the second ridge at a position corresponding to the first ridge, wherein the first recessed groove is formed so as to be capable of accommodating the second ridge of another solenoid valve that is adjacent to the first side surface of the solenoid valve, and the second recessed groove is formed so as to be capable of accommodating the first ridge of another solenoid valve that is adjacent to the second side surface of the solenoid valve, wherein the first insertion hole and the second insertion hole are formed in the valve body such that a portion of the first insertion hole and a portion of the second insertion hole in a diametrical direction respectively extend through the inside of the first ridge and the inside of the second ridge, and wherein the first and second insertion holes and the first and second recessed grooves are formed such that, on a plane that is perpendicular to the first side surface and the second side surface and that includes an axis of the spool-sliding hole, the shortest distance from the axis of the spool-sliding hole to a hole wall surface of the first insertion hole, the shortest distance from the axis of the spool-sliding hole to a hole wall surface of the second insertion hole, the distance from the axis of the spool-sliding hole to a bottom wall surface of the first recessed groove, and the distance from the axis of the spool-sliding hole to a bottom wall surface of the second recessed groove are equal to one another.

8. The manifold solenoid valve assembly according to claim 7, wherein a cross-sectional shape of the spool-sliding hole in a direction perpendicular to the axis of the spool-sliding hole is a non-circular hole shape having a first axis oriented in the height direction of the valve body and a second axis oriented in the transverse direction of the valve body, the first axis being longer than the second axis.

9. The manifold solenoid valve assembly according to claim 8, wherein the cross-sectional shape is a shape having left and right hole side walls, which extend linearly in a direction in which the first axis extends and which are parallel to each other, upper and lower hole end walls, the upper hole end wall connecting first ends of the left and right hole side walls to each other, the lower hole end wall connecting second ends of the left and right hole side walls to each other, or an elliptical shape.

10. A manifold solenoid valve assembly comprising:

a solenoid valve including a valve body that has a longitudinal direction, a transverse direction, and a height direction and in which a spool-sliding hole extending through the valve body in the longitudinal direction is formed and a spool that is slidably inserted in the spool-sliding hole; and a manifold base having a plurality of valve-mounting surfaces onto which a plurality of the solenoid valves are mounted so as to be arranged in a row by using mounting screws, wherein a first insertion hole and a second insertion hole that allow the mounting screws to be inserted through the first insertion hole and the second insertion hole are formed in the valve body so as to be paired with each other and to extend in the height direction of the valve body, wherein a plurality of first mounting holes and a plurality of second mounting holes are formed in the valve-mounting surfaces such that each of the first mounting holes and a corresponding one of the second mounting holes are paired with each other and that each of the first mounting holes corresponds to the first insertion hole and enables the solenoid valve to be mounted onto a corresponding one of the valve-mounting surfaces as a result of one of the mounting screws being screwed into the first mounting hole, and each of the second mounting holes corresponds to the second insertion hole and enables the solenoid valve to be mounted onto a corresponding one of the valve-mounting surfaces as a result of one of the mounting screws being screwed into the second mounting hole, wherein the valve body has a first side surface and a second side surface that extend in the longitudinal direction of the valve body and that are parallel to each other, wherein a first ridge extending along the first insertion hole and a first recessed groove extending parallel to the first ridge are formed on and in the first side surface, and a second ridge and a second recessed groove are formed on and in the second side surface, the second ridge extending along the second insertion hole at a position corresponding to the first recessed groove, the second recessed groove extending parallel to the second ridge at a position corresponding to the first ridge, wherein the first recessed groove is formed so as to be capable of accommodating the second ridge of another solenoid valve that is adjacent to the first side surface of the solenoid valve, and the second recessed groove is formed so as to be capable of accommodating the first ridge of another solenoid valve that is adjacent to the second side surface of the solenoid valve, wherein the first insertion hole and the second insertion hole are formed in the valve body such that a portion of the first insertion hole and a portion of the second insertion hole in a diametrical direction respectively extend through the inside of the first ridge and the inside of the second ridge, and wherein, when a height from the first side surface to a top surface of the first ridge and a height from the second side surface to a top surface of the second ridge are each denoted by h1, a depth from the first side surface to a bottom wall surface of the first recessed groove and a depth from the second side surface to a bottom wall surface of the second recessed groove are each denoted by h2, a minimum wall thickness between a hole wall surface of the first insertion hole and the top surface of the first ridge and a minimum wall thickness between a hole wall surface of the second insertion hole and the top surface of the second ridge are each denoted by c, and a diameter of the first insertion hole and a diameter of the second insertion hole are each denoted by d, a dimensional relationship between these values satisfies the following formulas:

$c+d-h1=h2$ and $h1>h2$.

11. The manifold solenoid valve assembly according to claim 10, wherein a cross-sectional shape of the spool-sliding hole in a direction perpendicular to the axis of the spool-sliding hole is a non-circular hole shape having a first axis oriented in the height direction of the valve body and a short second axis oriented in the transverse direction of the valve body, the first axis being longer than the second axis.

12. The manifold solenoid valve assembly according to claim 11, wherein the cross-sectional shape is a shape having left and right hole side walls, which extend linearly in a direction in which the first axis extends and which are parallel to each other, upper and lower hole end walls, the upper hole end wall connecting first ends of the left and right hole side walls to each other, the lower hole end wall connecting second ends of the left and right hole side walls to each other, or an elliptical shape.

* * * * *